Oct. 31, 1950  W. J. WHITEHEAD  2,527,867
GOVERNOR CONTROL MECHANISM
Filed May 14, 1947  7 Sheets-Sheet 2

Inventor
Willard J. Whitehead
By Carlson, Pitzner, Hubbard & Wolfe
Attorneys

Oct. 31, 1950     W. J. WHITEHEAD     2,527,867
GOVERNOR CONTROL MECHANISM
Filed May 14, 1947     7 Sheets-Sheet 4

Oct. 31, 1950 W. J. WHITEHEAD 2,527,867
GOVERNOR CONTROL MECHANISM
Filed May 14, 1947 7 Sheets-Sheet 7

INVENTOR
Willard J. Whitehead
ATTORNEY

Patented Oct. 31, 1950

2,527,867

UNITED STATES PATENT OFFICE 2,527,867

GOVERNOR CONTROL MECHANISM

Willard J. Whitehead, Rockford, Ill., assignor to Woodward Governor Company, Rockford, Ill., a corporation of Illinois Application May 14, 1947, Serial No. 748,001

21 Claims. (Cl. 264—14)

This invention relates to speed responsive governors for actuating a control device such as a valve to control a speed regulator and has more particular reference to the actuation of the control device independently of the governor so as to cause the servo actuator normally controlled by the governor to perform certain auxiliary functions.

One object is to provide a control mechanism of the above character in which the control device is operated by the auxiliary actuator to cause the controlled servo to perform those functions required in the operation of a variable pitch aircraft propeller.

Another object is to provide such a control mechanism in which the auxiliary actuator is adapted to override the governor and move the control device positively in both directions.

Another object is to incorporate the auxiliary control in a hydraulic governor and to utilize an auxiliary supply pressure to energize the auxiliary actuator.

A further object is to provide an auxiliary actuator which operates differentially in response to the application of different supply pressures to the governor proper.

The invention also resides in the novel construction and arrangement of the parts by which the positive and differential operation of the auxiliary actuator are effected.

Other objects and advantages of the invention will become apparent from the following detailed description taken in connection with the accompanying drawings, in which Figure 1 is a schematic view and circuit diagram of a hydraulic governor and the servo controlled thereby, embodying the novel features of the present invention, the governor and its servo being shown in diametrical section.

Figs. 2, 3, 4, and 5 are similar views, showing different operating positions of the parts.

Figure 4:
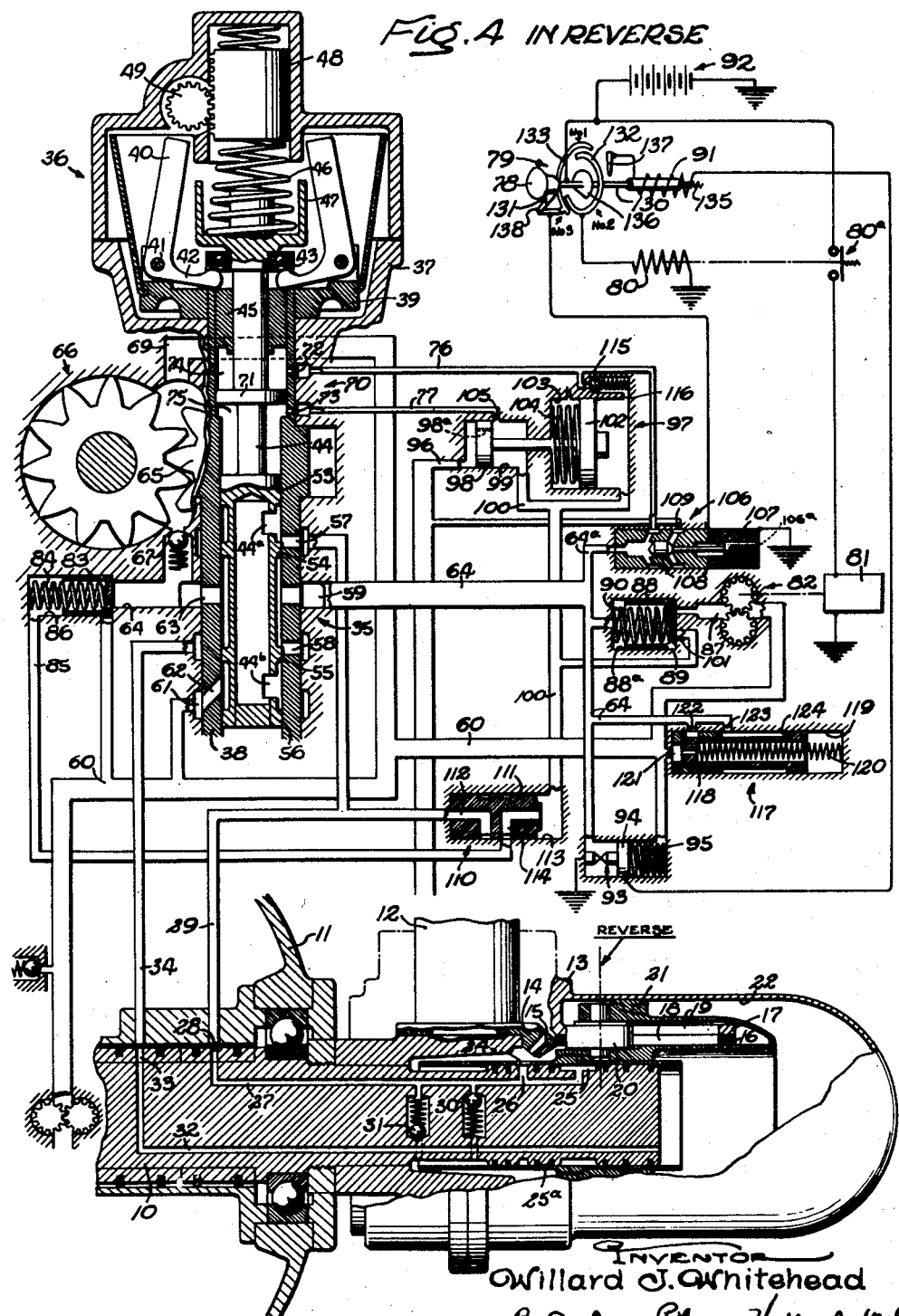

For purposes of illustration, the invention is shown in the drawings embodied in a governor for controlling a hydraulically actuated aircraft propeller mounted on the crankshaft 10 projecting from the casing 11 of an aircraft engine and having blades 12 journaled in a hub 13 to turn about their individual radial axes. Each blade carries a bevel gear 14 meshing with a similar gear 15 on the rear end of a sleeve 16 which is adapted to turn about the propeller axis by being journaled in a sleeve 17 projecting axially from the propeller hub. Inclined cam slots 18 and 19 in the sleeves 16 and 17 receive a roller 20 journaled on a piston 21 which slides in a cylinder 22 projecting forwardly from the propeller hub. When the roller 20 is at the extreme forward end of the cam slots (Fig. 2), the propeller blades are fully feathered. Reverse movement of the piston to the other limit position decreases the blade pitch through the normal operating range indicated in Fig. 1 and through the zero pitch position to a reverse pitch position (Fig. 4).

A tube 23 threaded axially through the piston slides along the exterior of the projecting end of the crankshaft 10 and has a port 24 therein which cooperates with a slot 25 and an orifice 26 in the shaft to control the pressure fluid to and from the inboard end of the servo cylinder, these orifices communicating with a channel 27 leading through a transfer ring 28 to a conduit 29 in a nonrotatable part of the engine housing. A check valve 30 permits the flow of fluid from the channel 27 to the inboard end of the cylinder in response to a pressure differential of 30 p. s. i. A similar check valve 31 permits the flow of fluid from the inboard end of the servo cylinder to the channel 27 in response to a pressure differential of 400 p. s. i. The outboard end of the servo cylinder is in continuous communication through a passage 32 in the shaft 10 with a transfer ring 33 and a nonrotatable conduit 34.

The flow of pressure fluid to and from the servo under normal flying conditions is controlled by a valve 35 actuated by a governor 36 whose casing 37 is mounted on the engine by which the governor is driven through connections (not shown) leading to a drive shaft in the form of a sleeve 38 journaled in the lower part of the governor casing. Fast to the upper end of the sleeve is a head on which upstanding flyweights 40 are pivoted at 41. Inwardly projecting arms 42 on the flyweights bear upwardly against the outer race of a ball bearing 43 whose inner race is on a stem 44 slidably guided in a plug 45 in the upper end of the sleeve and urged downwardly by a compression type spring 46 seated in a cup 47 on the upper end of the stem and acting against an abutment 48 slidable in the governor casing. By turning a pinion 49 which meshes with rack teeth on the abutment, the spring stress may be varied as desired to change the speed setting of the governor. Such adjustment may be accomplished, for example, by shifting a hand lever 50 (Fig. 5) connected through a cable 51 to a pulley 52 on the shaft of the pinion 49.

The valve 35 is of the double acting type and formed by lands 53, 54, 55, and 56 on the lower end portion of the valve stem 44. The lands 54 and 55 cooperate with ports 57 and 58 in the sleeve 38 to control the flow of pressure fluid from the valve inlet 59 to one or the other of the conduits 29 and 34 leading to the servo or through one of these conduits to a low pressure line 60 connected through a ring 61 and a port 62 to the valve space between the lands 55 and 56. The hollow lower end portion of the valve stem has a port 44$^a$ therein between the lands 53 and 54 and a similar port 44$^b$ between the two lower lands.

The valve inlet 59 communicates through a port 63 with the valve space between the lands 54 and 55 and also directly with a line 64 which is supplied with fluid under pressure by a pump 66 mounted within the governor casing and having one gear 65 splined on the drive sleeve 38. The pump outlet discharges through a 15 p. s. i. check valve 67, and the pump inlet is connected through a passage 69 with the low pressure line 60 to which fluid at about 75 p. s. i. is delivered by the engine lubricating pump 68. Fluid from the pump outlet 64 may be bypassed to the low pressure line 60 by moving a member 83 against the action of a spring 84. The valve member 83 slides in a cylinder 86 which is normally connected through a passage 85 in a manner to be described later, to the passage 29 leading to the inboard side of the servo cylinder so that the pressure normally maintained in the supply line 64 will be somewhat greater by 175 p. s. i. than the pressure in the inboard passage 29.

Figure 1:
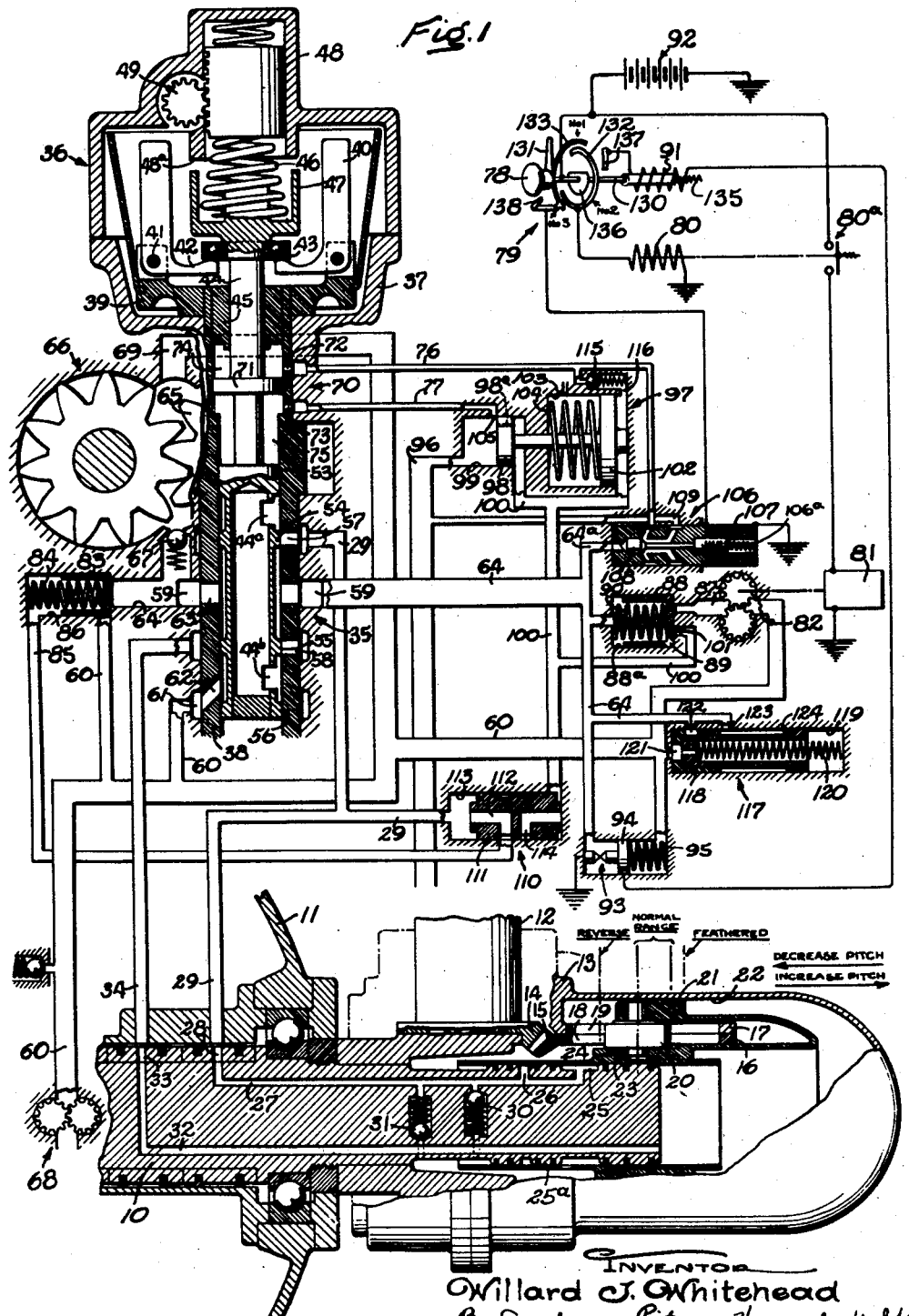

When the engine is operating at the speed predetermined by the adjustment of the speeder spring 46, the valve lands will be centered as shown in Fig. 1, there being no fluid flow to or from the servo, so that the propeller blades remain at a fixed position. Outward movement of the flyballs resulting from a speed increase raises the valve stem 44 to admit pressure fluid to the conduit 29 and thence through the conduit 27 and the registering ports 24 and 25 to the inboard side of the piston 21. At the same time, the outboard end of the servo cylinder is connected to the low pressure line 60 through the conduits 32 and 34 and the sleeve ports 58 and 62. The piston thus moves outwardly to increase the blade pitch until the engine speed has been restored to the predetermined value. In response to a speed decrease, the valve stem 44 is lowered by the speeder spring, thereby reversing the connections to the servo cylinder ends and causing the piston 21 to move inwardly and decrease the blade pitch until the selected propeller speed has been restored.

The propeller actuating and control apparatus thus far described is typical of the environment in which the present invention is adapted to be used. As applied to this use, the invention contemplates the provision of means for overriding the action of the governor 36 and actuating the pilot valve 35 in a novel manner to perform auxiliary functions including full feathering of the propeller blades, reversing the pitch of these blades and restoring the normal governor control either from the feathered or reverse pitch positions of the blades. The overriding action is produced by an auxiliary actuator 70 for the valve 35, which actuator in this instance is pressure operated and arranged within the drive sleeve 38 near the upper end thereof. It comprises a piston 71 rigid with the valve stem 44 and slidable in the sleeve 38 between ports 72 and 73 for connecting the upper and lower ends 74 and 75 of the actuator cylinder with rings which communicate with passages 76 and 77. By making the piston 71 somewhat larger and the upper end of the stem 44 somewhat smaller than the land 53, the upper side of the piston has an effective pressure area somewhat larger than the lower side of the piston so that when fluid at the same pressure is applied to both of the chambers, the valve stem 44 will be moved downwardly toward pitch-decreasing position.

Figure 2:
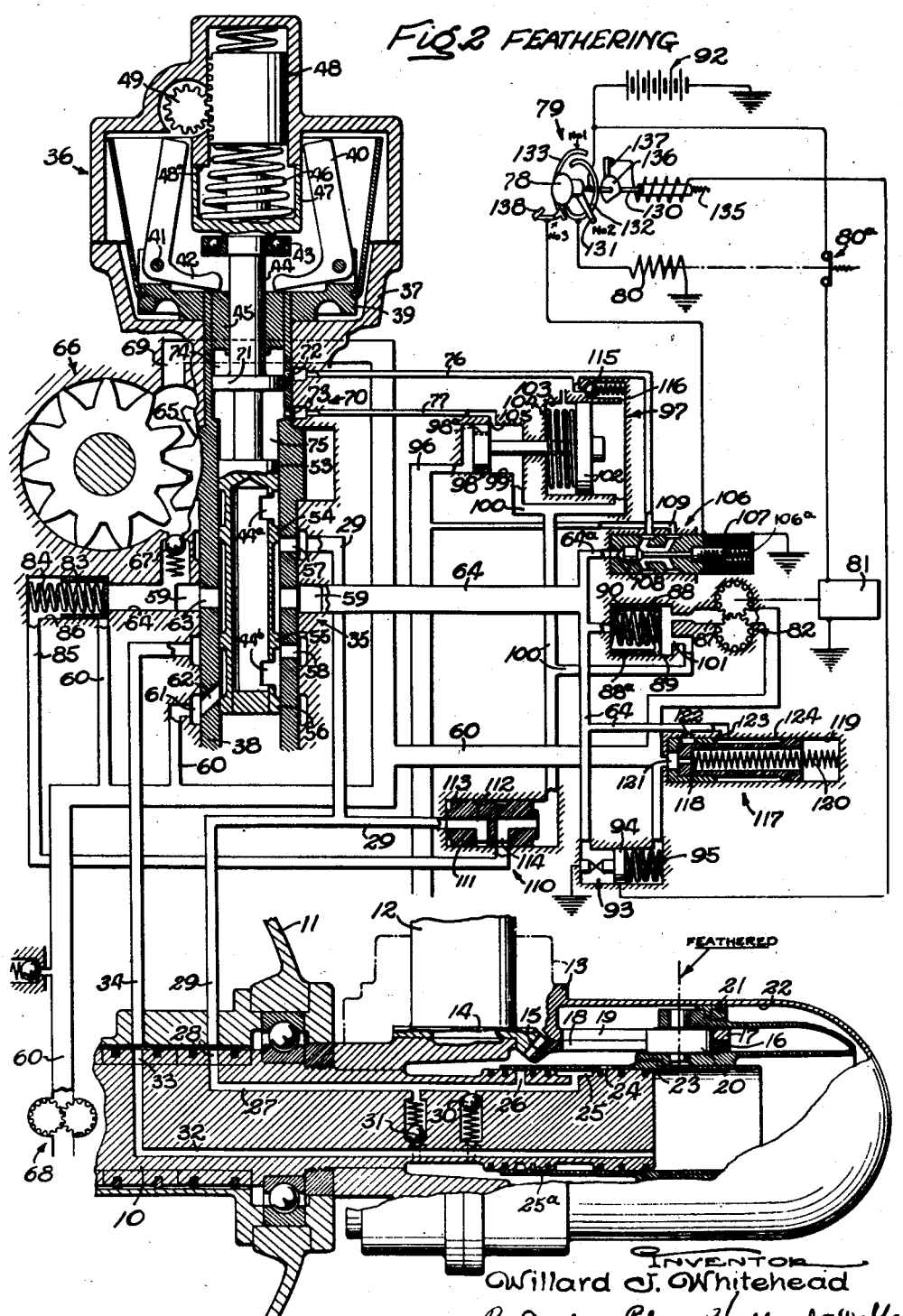

Selective energization of the auxiliary valve actuator 70 is controlled in the present instance by manually operating a control member in the form of a knob 78 which may be turned selectively to three different positions (Nos. 1, 2, and 3) in which a switch mechanism 79 is actuated differentially according to the auxiliary function to be performed by the servo. Herein, the knob is on a shaft 130 slidably supported in suitable guides for endwise movement by pushing inwardly on the knob or for angular motion by turning the knob. The shaft carries a radially projecting contact 131 which, when the knob is pushed forwardly against the action of a spring 135, is adapted to engage either of two stationary semicircular contacts 132 and 133 whose opposite ends overlap each other at the No. 1 and No. 3 positions of the knob. Closure of the switch formed by the contacts 131 and 132 completes a circuit from a battery 92 through the coil 80 of a relay whose switch 80$^a$ energizes an electric motor 81 which drives a gear pump 82 that receives fluid from the low pressure passage 60 and is capable of delivering fluid at pressures up to 800 p. s. i. to an auxiliary fluid supply line 87. When the pump is stopped, the outlet 87 is closed by a member 88 (Fig. 1) slidable in a cylinder 88$^a$ which is connected to the supply line 64. If the fluid pressure delivered by the pump 82 increases, the member 88 is moved against the action of a spring 90 to permit the flow of fluid to the line 100 and through the port 89 to the line 64 as shown in Fig. 2. When this pump is stopped, the normal pressure produced in the line 64 by the pump 66 maintains the valve member 88 in the closed position shown in Fig. 1.

The shaft 130 also carries a contact 136 which, in the No. 2 and No. 3 positions of the shaft, is adapted to engage a contact 137 when the shaft is pushed forwardly. Closure of this switch completes a circuit through a pressure responsive switch 93 for energizing a solenoid 91 whose armature is carried by the shaft 130 so that the latter is held inwardly against the action of the spring 135 when the solenoid is energized. The movable contact of the switch 93 is on a plunger 94 urged toward closed position by a spring 95 and slidable in a cylinder connected to the supply line 64. The arrangement is such that this switch remains closed until the supply line pressure has increased above about 600 p. s. i.

The lower chamber 75 of the auxiliary valve actuator is adapted to be connected through the passage 77 either with a low pressure or drain line 96 or with the supply line 64 when the latter is supplied by the high pressure pump 82. This is accomplished by a transfer valve 97

(Figs. 1 to 4) comprising a plunger 98 movable in a cylinder 99 which is connected at its head end with the drain line 96 and at its rod end with a passage 100 terminating in a port 101 which is normally closed by the valve member 88 when the pump 82 is idle. The rod of the plunger 98 is connected to a piston 102 reciprocable in a cylinder 103 whose head end is connected to the passage 100. Normally, that is, when the passage 100 is disconnected from the supply line, a spring 104 urges the valve plunger 98 to the position shown in Fig. 1, thereby uncovering a port 105 to connect the drain line 96 to the passage 77 and the lower actuator chamber 75.

When the passage 100 is supplied with fluid at the normal pressure, as will be described later, or by opening of the valve 88 is response to starting of the pump 82, the valve plunger 98 will be shifted to connect the port 105 with the passage 100 (see Figs. 2, 3 and 4), thereby connecting the lower actuator chamber 75 with the passage 100 and therefore with the pressure supply line 64.

The upper actuator chamber 74 and the passage 76 leading thereto are adapted to be connected either to the drain line 96 or to the supply line 64. This is accomplished by a solenoid actuated valve 106 whose coil 107 is energized upon manual closure of the switch formed by engagement of the contact 131 with the contact 133 when the control knob is pushed forwardly with the knob 78 in either the No. 1 or the No. 3 position. The solenoid 107 is also energized upon closure of a second switch formed by the contact 131 and a contact 138, these contacts engaging upon retraction of the shaft 130 when the knob 78 is in the No. 3 position (Fig. 4).

Figure 5:
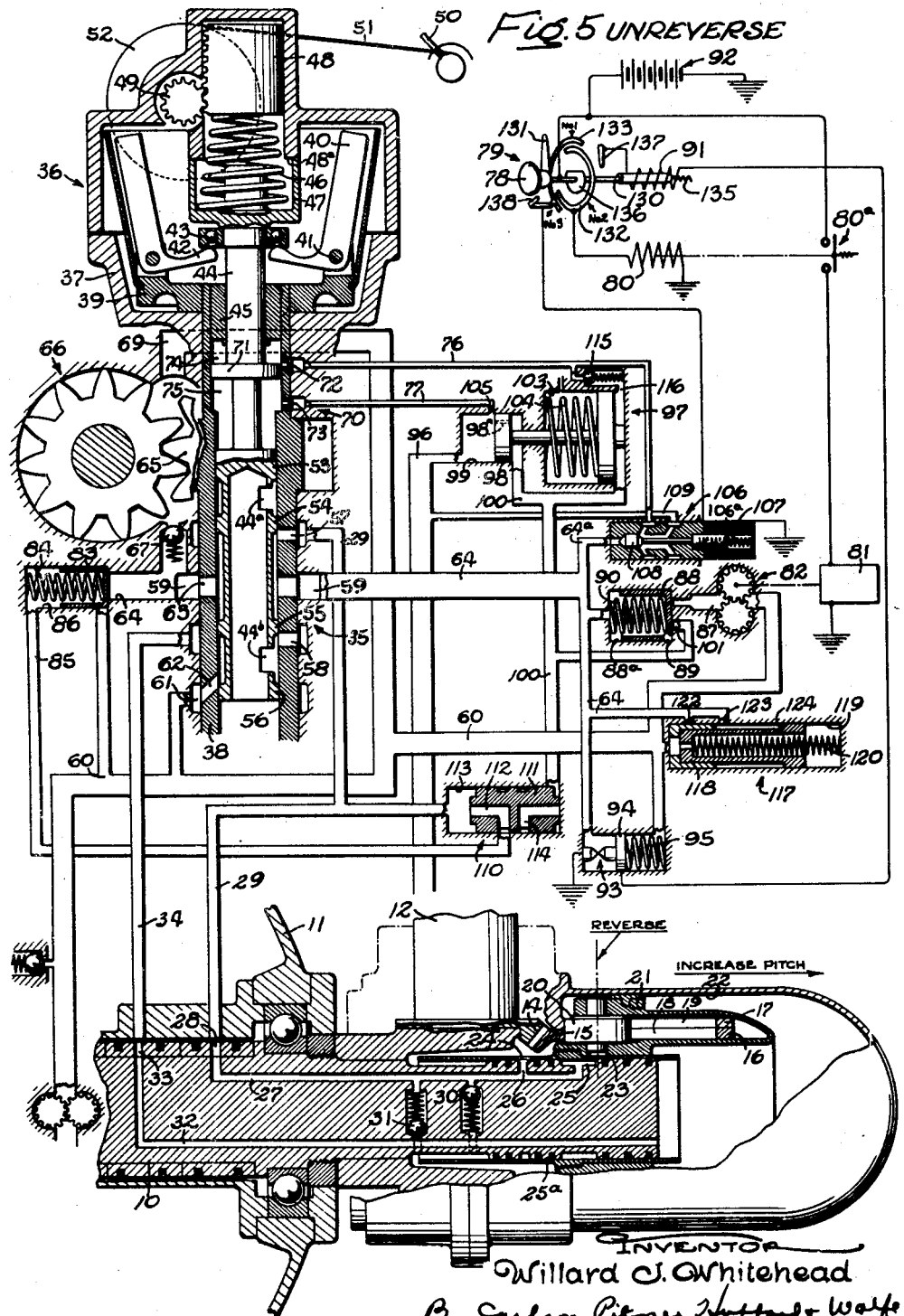

When the coil 107 is deenergized, the member 108 of the valve 106 is held by a spring 106ᵃ positioned as shown in Figs. 1, 2, and 5, whereupon the passage 76 is connected through the valve to a passage 109 leading to the drain line 96. Shifting of the valve member to its other position when the solenoid 107 is energized, blocks off the end of the passage 109 leading into the valve, thereby disconnecting the passage 76 from the drain line. At the same time, the end of the passage 64ᵃ is uncovered, and this passage is connected directly to the passage 76, thereby connecting the supply line 64 to the actuator chamber 74.

In order to permit the pressure in either of the servo supply lines 29 and 34 to build up to any required value when the pump 82 is operating, it is necessary to disable the by-pass valve 83. This is accomplished by a valve 110 having a member 111 movable in a cylinder 113, one end of which is connected directly to the conduit 29 leading to the inboard end of the servo cylinder. The member 111 is thus urged by the inboard pressure to the position shown in Fig. 1, in which a passage 112 connects the passage 29 to the passage 85 leading to the cylinder 86 of the by-pass valve 83. Thus, the inboard servo pressure is added to the force of the spring 84 in controlling the movement of the by-pass valve member. The other end of the cylinder 113 is connected to the passage 100 so that when the pump 82 is delivering high pressure fluid to the supply line 64, the valve member 111 is shifted to the left (see Figs. 2, 3 and 4) whereupon a passage 114 connects the passages 85 and 100, thereby applying the pressure of the supply line 64 to the by-pass valve cylinder 86. As a result, the valve member 83 is held by the spring 84 in closed position thereby preventing by-passing. At this time, if the pump 66 is not delivering oil, the check valve 67 becomes closed to prevent leakage from the supply line 64 through the pump 66.

For a purpose to be described later, a check valve 115 is interposed in a passage 116 between the passage 76 and the rear end of the transfer valve cylinder 103. This valve becomes effective when fluid under normal pressure is applied to the upper actuator chamber 74 and operates to permit the flow of fluid through the passage 100 to shift the valve member 111 to the left and thereby hold the by-pass valve 83 closed.

A high pressure relief valve 117 is provided to release fluid from the supply line 64 when an excessively high pressure of about 800 p. s. i. is developed. This valve comprises a member 118 slidable in a cylinder 119 and normally urged by a spring 120 to interrupt a connection between ports 121 and 122 respectively leading to the low pressure line 60 and a branch of the supply line 64, the latter also being connected through a port 123 so that the supply pressure acts on a piston area 124.

Constant speed operation

The operation of the mechanism above described under the normal control of the governor 36 to adjust the propeller blade pitch automatically and maintain operation of the engine and propeller at constant speed has been previously described. During such operation, the various parts that come into play in performing the auxiliary functions are positioned as shown in Fig. 1, the control knob being retracted and in its No. 1 position. Thus the chambers 74 and 75 of the auxiliary valve actuator are connected through the valves 97 and 106 to the drain line 96 so that the pilot valve stem 44 is free to move back and forth in response to speed changes detected by the governor.

Feathering

To feather the propeller, the control knob is turned to the No. 2 position and pushed inwardly as shown in Fig. 2 to engage the contacts 131 and 136 with the contacts 132 and 137. Thereupon, energization of the relay coil 80 closes the switch 80ᵃ to start the feathering pump motor 81. At the same time and by closure of the switch 136, 137, the solenoid 91 becomes energized through the then closed pressure responsive switch 93 so that the shaft 130 is held inwardly and the switch 131, 132 is maintained closed to keep the motor 81 operating without the necessity of manually holding the knob 78 inwardly.

The fluid pressure built up in the outlet of the feathering pump 82 shifts the valve member 88 against its spring 90, thereby connecting the feathering pump to the line 64 supplying the main pilot valve 35 and also to the high pressure side of the pressure switch actuating piston 94. At the same time, the feathering pump is connected through the passage 100 to the shuttle valve 110 and to the transfer valve 97. The piston 111 is thus shifted to the left so as to connect the passages 85 and 100 by which high pressure fluid is delivered to the spring side of the by-pass valve 83, thereby disabling the latter against further by-passing of the fluid out of the pilot valve supply line 64.

The rise of the pressure in the passage 100 also results in shifting of the transfer valve plunger 98 to the left (Fig. 2), thereby disconnecting the chamber 75 of the valve actuator 70 from the drain line 96 and permitting the flow of high pressure fluid through the passage 77 and the port 73 to the chamber 75. This increased pressure acting on the piston 71 raises the pilot valve stem 44 to pitch-increasing position, as limited by engagement of the upper end of the cup 47 with an abutment 48ª on the governor casing. The high pressure fluid now delivered by the pump 82 to the supply line 64 is permitted by the main pilot valve 35 to flow through the orifice 57 and the passages 27 and 29 to the inboard end of the servo cylinder 22, causing the servo piston to increase the blade pitch until full feathering of the blades is achieved as shown in Fig. 2. As the port 24 passes out of communication with the slot 25 during this movement, the check valve 30 permits the continued flow of fluid to the inboard end of the servo. At the feathered position, the blades come against mechanical stops and therefore the pressure in the various interconnected high pressure lines will build up rapidly until the spring 95 of the pressure switch is overcome at 600 p. s. i., whereupon the switch 93 is opened. This breaks the circuit of the solenoid 91 so as to permit the shaft 130 to move under the action of the spring 135 and open the switch 131, 132 thereby deenergizing the motor 81. Operation of the feathering pump is thus discontinued automatically as soon as the propeller blades have been feathered.

*Unfeathering*

Figure 3:
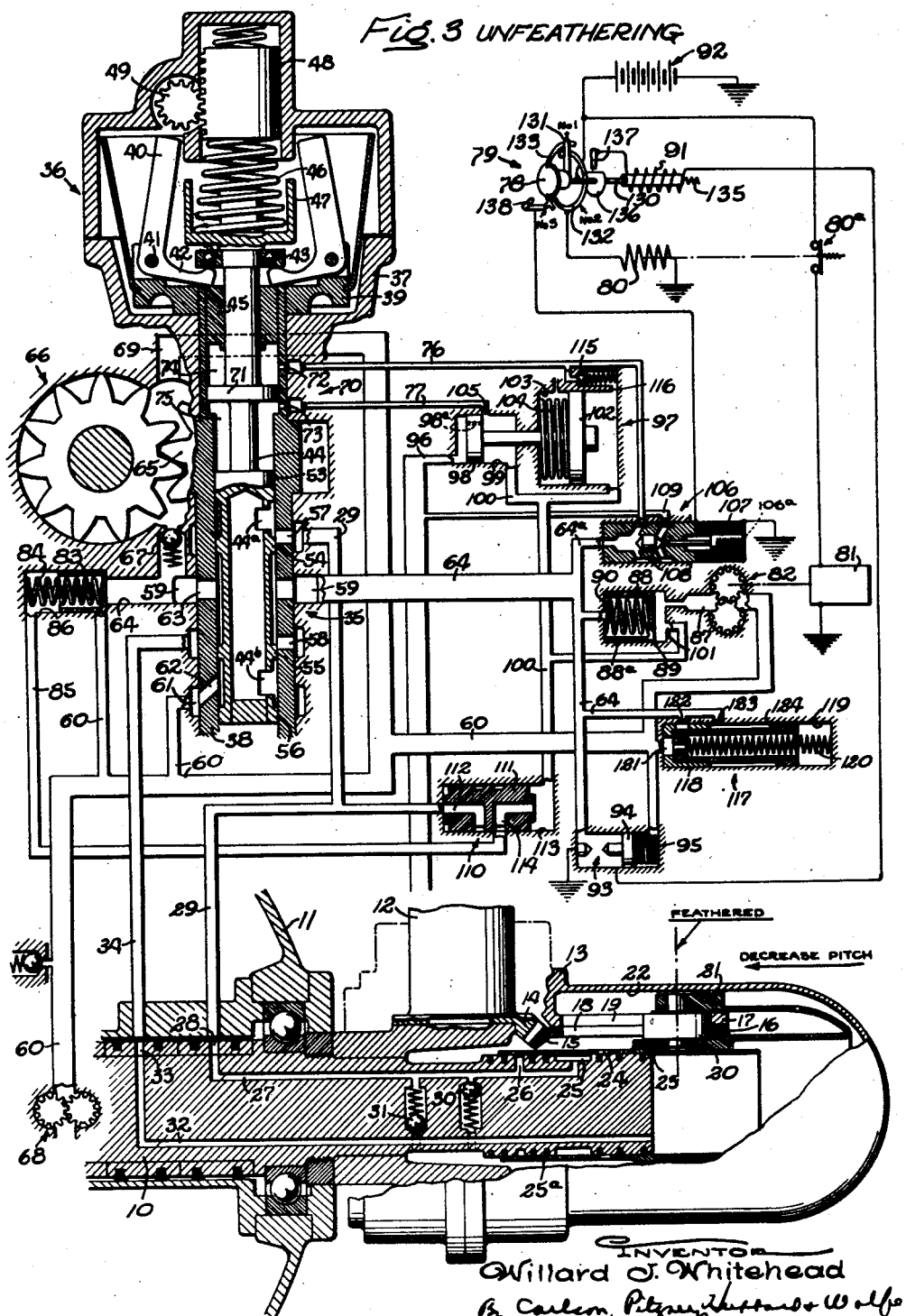

When it is desired to unfeather the propeller, the control knob 78 is turned to the No. 1 position, pushed forwardly (see Fig. 3) and held there manually during the unfeathering operation. The feathering pump 82 is started by closure of the switch 131, 132 to energize the relay coil 80. The solenoid 107 is also energized by closure of the switch 131, 133 thereby shifting the valve member 108 to the right to disconnect the upper end 74 of the auxiliary actuator from the drain line 96 and connect this end to the supply line 64 as shown in Fig. 3, the latter connection being through the passages 64ª and 76. In the ensuing operation of the feathering pump 82, the parts of the valves 97 and 110 remain in the positions attained during feathering. The pump 82 delivers fluid at high pressure to both sides 74 and 75 of the auxiliary actuating piston 71, which, owing to the larger effective pressure area on its upper side, is moved downwardly to a limit pitch-decreasing position which may be determined by engagement of the flyball arms 42 with the governor ballhead 39 as shown in Fig. 3. High pressure fluid from the supply line 64 is now admitted through the governor valve 35 to the passages 34 and 32 leading to the outboard end of the servo cylinder, the inboard end of the latter being connected to the low pressure line 60 through the check valve 31, the passage 29, the orifice 57, the hollow valve stem and the port 62 in the valve sleeve. The servo piston begins to move in the pitch-decreasing direction when the inboard pressure builds up to 400 p. s. i. and opens the valve 31. When the propeller blades reach their normal governed range, the port 24 is exposed to the area of the slot 25 after which fluid is exhausted through the ports 24 to the low pressure line 60. The operator may then release the control knob 78 allowing the switches 131, 132 and 131, 133 to open thereby deenergizing the solenoid 107 and the pump motor 81. In response to the ensuing pressure fall in the interconnected high pressure lines, the various valves will be restored to their normal position (Fig. 1) and both of the chambers 74 and 75 are reconnected to the drain line, the pilot valve 35 being again placed in control of the governor 36 so that normal constant speed operation may continue.

*Reversing blade pitch*

Reversing the pitch of the propeller blades is accomplished by turning the knob 78 to the No. 3 position and pushing the same forwardly to bring the contact 131 into engagement with the contacts 132 and 133 and also to close the switch 136, 137 so that the solenoid 91 is energized to hold the shaft 130 inwardly, the pressure switch 93 being closed at this time. As a result of closure of the switches 131—132, 131—133, the motor 81 is started and the various valves are actuated the same as in the case of unfeathering to apply high pressure fluid to both the chambers 74 and 75 so as to hold the pilot valve stem 44 depressed to its pitch-decreasing position. Fluid flows under the control of the pilot valve to the outboard end of the servo, and the piston 21 moves inwardly carrying the port 24 past the slot 25 at which time the valve 31 opens at 400 p. s. i and allows fluid to flow out of the inboard end of the servo until the port 24 comes into register with the port 26. This occurs when the pitch of the propeller blades has been reversed. The follower roller 20 will then be at its limit position in the rear ends of the cam slots 18 and 19 as shown in Fig. 4 whereupon the pressure of the fluid in the lines supplied by the pump 82 builds up above 600 p. s. i. thereby opening the switch 93. This deenergizes the solenoid 91 and allows the control shaft 130 to move outwardly, the contact 131 disengaging the contact 132 to deenergize the relay 80 and stop the feathering pump motor 81 automatically. In the outward motion of the shaft 130, the contact 131 engages the contact 138 (Fig. 4) so that the solenoid 107 remains energized.

The various parts are then positioned as shown in Fig. 4, the solenoid valve 106 maintaining the connection between the supply line 64 and the upper actuator chamber 74 through the passage 76. At the same time, fluid from the passage 76 is diverted through the check valve 115 into the actuating cylinder of the transfer valve 97 and also through the passage 100 into the cylinder 113 of the valve 110. The plunger 111 is thus maintained in its lefthand position, and the supply line 64 remains connected to the cylinder 86 of the by-pass valve 83 which is thus maintained disabled so that the governor pump 66 may develop pressure sufficiently high to hold the blades effectually in reverse pitch. In response to this pressure, the transfer valve 97 is held energized to connect the passage 100 to the lower actuator chamber 75 and therefore to the supply line 64. Both chambers 74 and 75 are thus under the supply line pressure maintained by the booster pump 66 and in view of the differential piston areas, the valve stem 44 is held downwardly in the pitch-decreasing position to overcome any increased centrifugal force that may be exerted by the governor in response to speeding up of the engine. It is possible therefore to increase or decrease the speed of the reverse pitch propeller as desired in maneuvering the airplane.

Restoration of normal pitch

To unreverse the propeller or restore its blades to normal position, it is first necessary to return the control knob 78 to the "off" or No. 1 position (Fig. 5) thereby opening the switch 131, 138 to deenergize the solenoid 107 of the valve 106. The upper actuator chamber 74 is thus connected through the passage 109 to the drain line 90 by movement of the valve member 108. By fluid leakage to the drain through a small hole 98ª in the plunger 98, the pressure in the actuating chamber of the transfer valve 97 is dissipated and the valve plunger 98 is moved under the action of the spring 104 to connect the drain line 96 to the passage 77 and the lower end 75 of the actuator cylinder of the piston 71. This pressure reduction also releases the valve plunger 111 so that the latter is free to move back to normal position (Fig. 5) when pressure fluid is delivered to the inboard end of the servo to effect unreversing.

The auxiliary valve actuator 70 now being disabled, the valve stem 44 is free to move under the action of the governor. To effect such movement and change the blade pitch back to normal, the speed adjusting lever 50 is moved to the low speed position (Fig. 5), thereby reducing to a minimum, the force exerted by the speeder spring 46 in the downward direction. By adjusting the engine throttle (not shown), it is possible to speed up the engine, whereupon the flyballs 40 move outwardly overcoming the speeder spring and raising the valve as shown in Fig. 5 to permit the flow of pressure fluid delivered by the pump 66 to the inboard end of the servo cylinder. The piston 21 is thus moved forwardly to decrease the reverse pitch and then, after the blades have passed over center, to increase the pitch into the normal operating range. In this movement, pressure fluid flows through the valve 30 while the port 24 is passing over the land 25ª between the slot 25 and the port 26. When the port 24 reaches the slot 25, complete control of the governor is restored, and the engine throttle and the governor may be adjusted as desired for normal constant speed operation.

The control above described is adapted to override the governor 36 and actuate its valve 35 so that all of the required auxiliary movements of the propeller blades may be effected accurately and reliably without interfering with the various maneuvers required to be executed by the airplane under various operating conditions. Thus, while the blade pitch is reversed, the pilot valve stem is held positively under fluid pressure in the lowered position (Fig. 4) and as a result, the engine speed may be varied in any manner desired without danger of the propeller going out of reverse. The auxiliary valves utilized in performing the various functions are of simple construction and may be of small size since they are called upon to handle only small volumes of fluid, the flow of fluid to and from the servo being controlled by the main valve 35 when the latter is under the control of the auxiliary actuator 70, the same as when it is actuated by the governor.

Figure 6:
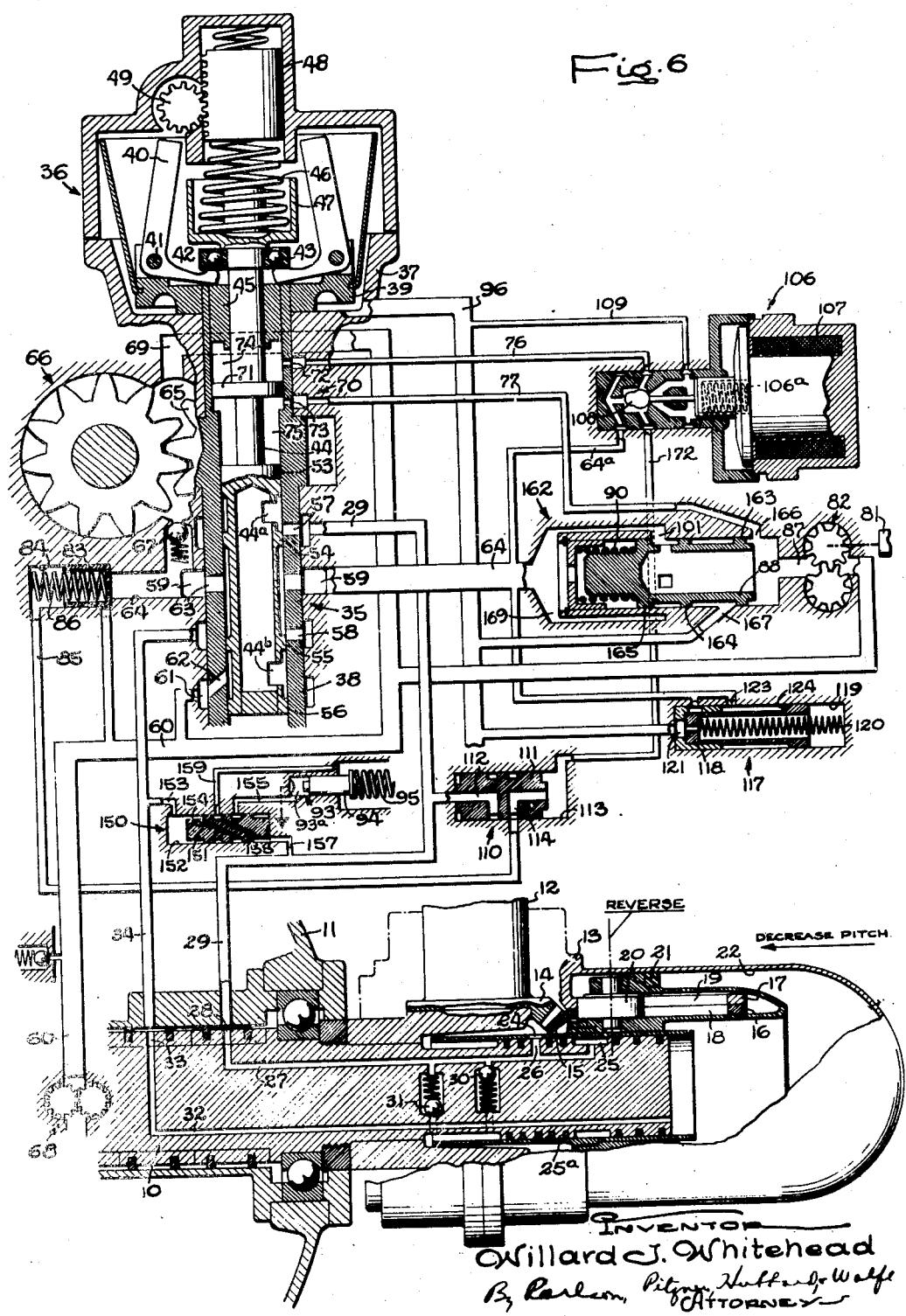
Fig. 6 is a view similar to the other figures but showing certain modified constructions and arrangements of the parts.
Figure 7:
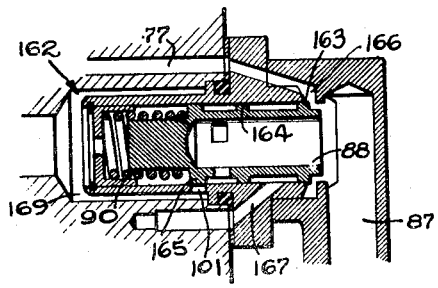
Fig. 7 is a fragmentary view showing a different position of one of the valves in the modified system.

Except for minor changes in the arrangement of the pressure switch 93 in the simplified construction of certain of the valves, the modified system shown in Figs. 6 and 7 is essentially the same as that previously described. The common parts of the two systems bear corresponding reference numbers.

One difference is in the arrangement of the pressure switch 93 by which the operation of the pump 82 is discontinued after feathering, unfeathering, or reversing of pitch in response to a 600 p. s. i. pressure differential between the supply and return lines 29 and 34 at a point adjacent the pitch-adjusting servo and beyond the control valve 35. In the form shown in Fig. 6, the cylinder 93ª of the plunger 94 is arranged to be connected to the servo line 34 as shown or to the line 29 by the action of a shuttle valve 150 including a plunger 151 shiftable in a cylinder 152 one end of which is connected in this instance through a passage 153 with the line 34. When the pressure in the latter is higher as is the case during decreasing of the propeller pitch, the plunger 151 is shifted as shown in Fig. 6 to admit high pressure fluid from the line 34 through a passage 154 and a port 155 to the pressure chamber 93ª. The other side of the plunger 94 is then connected to the return line 29 through passages 157, 158 and 159. Thus, the switch 93 opens when the pressure in the line 34 exceeds that in the line 29 by 600 p. s. i.

Now when high pressure fluid is supplied to the line 29 during feathering and unreversing, the pressure on the other end of the plunger 151 shifts the plunger to the left as viewed in Fig. 6 thereby uncovering the port 155 to connect the pressure chamber 93ª to the line 29 while the passage 159 is connected through the passage 154 with the line 34. In this case, the pressure switch is adapted to respond to a pressure rise in the line 29 600 p. s. i. above that in the line 34.

Figure 8:
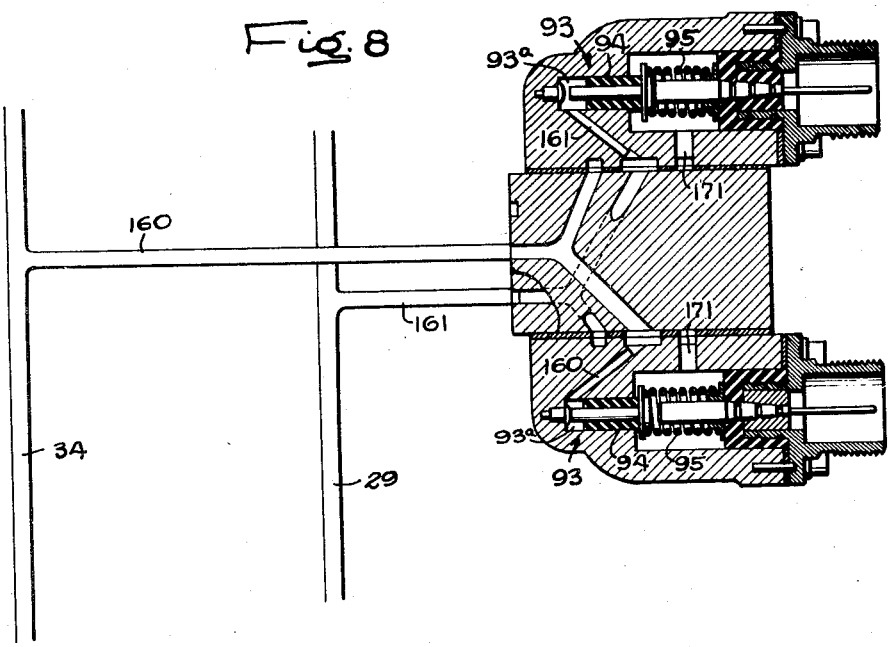
Fig. 8 is a fragmentary view illustrating still another modification.

If desired, the same result may be accomplished without the use of the shuttle valve 150 by employing two pressure switches 93 and 93' arranged as shown in Fig. 8 with the pressure chamber 93ª of one permanently connected to the line 34 through a passage 160 and the chamber of the other switch 93' permanently connected to the line 29 through a passage 161. In this case, the remote ends of the plungers 94 are connected through a passage 171 to the drain low pressure line 60. As shown, the switch 93 is opened by virtue of the high pressure in the line 34.

With this arrangement, it will be observed that the pressure switch 93 is directly responsive to pressure changes within the pitch adjusting servo and is not in any way affected by the pressure drop across the valve 35 or any other part of the system.

The modified system is simplified by combining the pressure responsive and transfer valves 88 and 97 of the system first described into one structure 162 (Figs. 6 and 7) in which the plunger member 88 is formed with axially spaced lands 163, 164 and 165 controlling the covering and uncovering of a port 166 which leads directly to the passage 77 and the lower end 75 of the auxiliary actuator for the main valve 35, a port 167 leading to the drain line 96 and the port 101 communicating with a chamber 169 which is connected to the line 64 by which high pressure fluid is delivered to the main valve 35. The spring 90 acts on the plunger 88 and, when the pump 82 is idle, holds the plunger in the right-hand limit position in which the land 163 is disposed beyond the port 166 so that the latter communicates with the drain line 96 through the port 167.

When the pump 82 is started as previously described, the pressure builds up to a value overcoming the spring 90 and moving the plunger 88 to the left to the position shown in Fig. 7. The ports 166 and 167 are disconnected and the former port is exposed to permit the high pressure fluid delivered by the pump 82 to flow, and fluid at high pressure is admitted through the passage 77 to the actuator chamber 75 thereby conditioning the main valve 35 for controlling the flow of fluid to the servo to feather the propeller. At this time, the land 165 still covers the port 101 but the latter is uncovered as the pressure builds up further and moves the valve member 88 to the position shown in Fig. 6. High pressure fluid is thus admitted to the main supply line 64. By admitting the fluid to the actuator 70 before such fluid is delivered to the supply line 64, the main control valve 35 will always be conditioned properly by the time the high pressure fluid supply is available for delivery to the servo for effecting feathering, etc., as previously described. Any possibility of the pressure building up suddenly and opening the pressure switch to stop the pump 82 before the valve 35 is properly positioned by the auxiliary actuator 70 is thus avoided.

During unfeathering and the other auxiliary pitch-decreasing, the admission of high pressure fluid to the actuator chamber 74 before there has been any substantial pressure build-up in the supply line 64 is insured by energization of the solenoid coil 107 simultaneously with the starting of the pump 82. The valve is thus moved to the position shown in Fig. 6 thereby disconnecting the passage 76 from the drain passage 109 and connecting the former to the supply line 64 through the passage 64ᵃ.

In this instance, the solenoid valve 160 also controls the connection between the high pressure line 64 and a passage 172 leading to one end of the cylinder 113 of the shuttle valve 110. Thus, whenever the solenoid is energized to position the valve member 108 as shown in Fig. 6 as will be the case during unfeathering and reversing of the propeller pitch, the high pressure fluid will be applied to the cylinder 113 to shift the valve member 111 to the left and thereby establish the desired back-up pressure on the by-pass valve 83. During the performance of the other auxiliary functions of feathering and unreversing, the pressure applied to the other end of the cylinder 113 will hold the member 111 in the right-hand position.

This application is a continuation-in-part of application Serial No. 646,245, filed February 8, 1946, now abandoned.

I claim as my invention:

1. For use with a hydraulic servo, the combination of, a speed responsive governor, means providing a primary source of pressure fluid, a valve adapted to control the flow of pressure fluid from said source to and from said servo including a member movable by said governor between first and second positions, means providing a supply line adapted to receive actuating fluid from said primary source, means providing a secondary source of pressure fluid delivered to said supply line, an auxiliary actuator for overriding said governor and moving said valve member including a differential piston on said valve member having a smaller area facing in the direction of motion of the valve member toward second position and an oppositely facing larger area, means acting during normal operation of said governor to release the pressure on opposite sides of said piston, a pressure responsive transfer valve operable in response to the delivery of fluid to said supply line from said secondary source to admit such fluid to said smaller piston area and move said valve member to said first position, and selectively operable valve means by which the supply line pressure may be applied simultaneously to the other area of said piston and move said valve member to said second position, said transfer valve and said valve means coacting in response to interruption of the delivery of fluid to said supply line from said secondary source to admit fluid from said primary source to said piston areas whereby to hold said valve member in the second position.

2. For use with a hydraulic servo, the combination of, a speed responsive governor, a valve adapted to control the flow of pressure fluid to and from said servo including a member movable by said governor between first and second positions, said valve having a supply line adapted to contain an actuating fluid, an auxiliary actuator for overriding said governor and moving said valve member including a differential piston on said valve member having a smaller area facing in the direction of motion of the valve member toward said second position and an oppositely facing larger area, means acting during normal operation of said governor to release the pressure on opposite sides of said piston, a transfer valve operable as an incident to the delivery of fluid at increased pressure to said supply line to admit fluid to said smaller piston area and cause movement of said valve member to said first position, and selectively operable valve means to correspondingly increase the pressure on the other area of said piston and thereby cause movement of said valve member to said second position.

3. For use with a hydraulic servo, the combination of, a speed responsive governor, a valve adapted to control the flow of pressure fluid to and from said servo including a member movable by said governor two positions, said valve having a supply line adapted to contain an actuating fluid, a piston on said valve member having areas of different sizes on opposite sides thereof, means acting during normal operation of said governor to release the pressure on said piston areas, a pressure responsive transfer valve operable upon the delivery of fluid at increased pressure to said supply line to admit such fluid to one of said piston areas to override said governor and move said valve member to one of said positions, and selectively operable means to correspondingly and simultaneously increase the pressure on said other piston area and move said valve member in the other direction by overriding said governor.

4. For use with a hydraulic servo, the combination of, a speed responsive governor, a valve adapted to control the flow of pressure fluid to and from said servo including a member movable by said governor between two positions, means providing a fluid supply line for said valve adapted to be supplied with actuating fluid under a normal pressure or at an increased pressure, a drain line, an auxiliary actuator for overriding said governor and moving said valve member including a piston on said valve member and fluid filled chambers on opposite sides thereof, the opposite sides of said piston having effective pressure areas of different sizes, means acting during normal operation of said governor to connect both of said chambers to said drain line and thereby place the valve in control of said governor, means operable as an incident to the admission of fluid at said increased pressure to said supply line to connect one of said chambers to the supply line and thereby cause movement of said piston and valve member to one of said positions, and selectively operable means for connecting said supply line simultaneously to said other chamber to cause movement of said piston and valve member to said other position.

5. For use with a hydraulic servo, the combination of, a speed responsive governor, a valve adapted to control the flow of pressure fluid to and from said servo including a member movable by said governor between two positions, an auxiliary actuator for said valve including a piston on said valve member and fluid filled chambers on opposite sides thereof, means acting during normal operation of said governor to release the pressure in both of said chambers, means operable as an incident to the delivery of fluid to said supply line at an increased pressure to increase the pressure in one of said chambers and cause movement of said piston and valve member to one of said positions irrespective of the governor, and selectively operable means to increase the fluid pressure in the other of said chambers to overcome the increased pressure in the first chamber and move said piston and valve member to said other position.

6. For use with a hydraulic servo, the combination of, a speed responsive governor, a valve adapted to control the flow of pressure fluid to and from said servo including a member movable by said governor between two positions, said valve having an inlet line adapted to be supplied with actuating fluid at a normal pressure or at an increased pressure, a drain line, an auxiliary actuator for overriding said governor and moving said valve member including a piston and fluid filled chambers on opposite sides thereof, means including a second valve selectively operable to connect one of said chambers either to said drain line or to said inlet, means responsive to the fluid pressure in said inlet and actuating said second valve to connect said one chamber to said drain line when the inlet pressure is at said normal value and to said inlet when the inlet pressure as at said increased value, and selectively operable valve means for connecting said other chamber either to said drain line or to said inlet irrespective of the inlet pressure.

7. For use with a hydraulic servo, the combination of, a speed responsive governor, a valve adapted to control the flow of pressure fluid to and from said servo including a member movable by said governor between two positions, said valve having an inlet adapted to be supplied with actuating fluid at a normal pressure or at an increased pressure, a low pressure line, an auxiliary actuator for overriding said governor and moving said valve member including a piston and fluid filled chambers on opposite sides thereof, valve means normally connecting one of said chambers to said low pressure line and operable upon the admission of fluid at said increased pressure to said inlet to connect the latter to the chamber, and independently acting valve means selectively operable to connect said other chamber either to said low pressure line or to said inlet.

8. For use with a hydraulic servo, the combination of, a speed responsive governor, a valve adapted to control the flow of pressure fluid to and from said servo including a member movable by said governor between two positions, said valve having an inlet, means for supplying fluid to said inlet at a normal pressure or at an increased pressure, an auxiliary fluid actuator for moving said valve member to either of said positions, and two valves normally operable to maintain said actuator deenergized, one of said valves being operable selectively in response to the admission of fluid to said inlet at said increased pressure to energize said actuator from said inlet to override said governor and move said valve member from one of said positions to the other.

9. For use with a hydraulic servo, the combination of, a speed responsive governor, a valve adapted to control the flow of pressure fluid to and from said servo including a member movable by said governor between two positions, said valve having an inlet, means for supplying fluid to said inlet at a normal pressure or at an increased pressure, an auxiliary fluid actuator for moving said valve member to either of said positions, two valves normally operable to maintain said actuator deenergized and operable selectively to energize said actuator from said inlet to override said governor and move said valve member from one of said positions to the other, and means operating as an incident to changes in the fluid pressure in said inlet for actuating one of said last mentioned valves.

10. For use with a hydraulic servo, the combination of, a speed responsive governor, a valve adapted to control the flow of pressure fluid to and from said servo including a member movable by said governor between two positions, said valve having an inlet, means for supplying fluid to said inlet at a normal pressure or at an increased pressure, an auxiliary fluid actuator for moving said valve member to either of said positions, said actuator having two fluid filled chambers and operable to move said valve member by changing the pressures in the chambers, a low pressure line, a valve automatically operable as an incident to pressure changes in said inlet to connect one of said chambers either to said low pressure line or to said inlet, and selectively operable valve means for connecting said other chamber to either said inlet or said low pressure line.

11. For use with a hydraulic servo, the combination of, a speed responsive governor, a valve adapted to control the flow of pressure fluid to and from said servo including a member movable by said governor between two positions, said valve having an inlet, means for supplying fluid to said inlet at a normal pressure or at an increased pressure, an auxiliary fluid actuator for moving said valve member to either of said positions, said actuator having two fluid filled chambers and operable to move said valve member by changing the pressures in the chambers, two valves one controlling the connection of said inlet and a low pressure line to one of said chambers and the other controlling the connection of the low pressure line and said inlet to said second chamber, and means for actuating said valves selectively.

12. For use with a hydraulic servo, the combination of, a speed responsive governor, a valve adapted to control the flow of pressure fluid to and from said servo including a member movable by said governor between two positions, said valve having an inlet, means for supplying fluid to said inlet at a normal pressure or at an increased pressure, an auxiliary fluid actuator for moving said valve member to either of said positions, said actuator having two fluid filled chambers and operable to move said valve member in response to changes in the pressures in said chambers, two valves one controlling the connection of said inlet and a low pressure line to one of said chambers and the other controlling the connection of the low pressure line and said inlet to said second chamber, manually controllable means for actuating one of said last mentioned valves, and means responsive to pressure changes in said inlet to actuate the other of said last mentioned valves.

13. For use with a hydraulic servo moving a part to be actuated in opposite directions, the combination of, a speed responsive governor, a valve adapted to control the flow of pressure fluid to and from said servo including a member movable by said governor between two positions, said valve having an inlet, a pump normally acting to supply fluid to said inlet under one pressure, a second selectively operable pump for supplying fluid to said inlet at an increased pressure, a by-pass valve responsive to the pressure in said inlet and normally operable to by-pass fluid when the fluid pressure exceeds a predetermined value, an auxiliary fluid actuator for moving said valve member to either of said positions, said actuator having two fluid filled chambers and operable to move said valve member in response to changes in the pressures in said chambers, valve means selectively operable to release the pressure in both of said chambers or to connect said inlet to either one or both of the chambers, and means operating automatically while either one of said chambers is connected to said inlet to disable said by-pass valve and prevent the by-passing of fluid from said inlet.

14. A servo control mechanism of the character described comprising a speed responsive governor, a valve having a fluid supply line and a member movable by said governor between two positions for causing a flow of fluid from said supply line through said valve in opposite directions respectively, a fluid actuator for said valve member for overriding said governor including a piston having oppositely facing areas of different sizes defining fluid chambers, means providing a low pressure line, valve means actuated automatically as an incident to pressure changes in said supply line and operable under a normal pressure therein to connect one of said chambers to said low pressure line, said valve means operating as an incident to a predetermined increase in said supply pressure to increase the pressure in one of said chambers, and other valve means normally operable to connect the other chamber to said low pressure line and selectively operable while said first chamber is under the supply pressure to connect the other of said chambers to said supply line.

15. A servo control mechanism of the character described, comprising a speed responsive governor, a valve having a fluid supply line and a member movable by said governor between two positions for causing a flow of fluid from said supply line through said valve in opposite directions respectively, a fluid actuator for said valve member for overriding said governor including a piston having oppositely facing areas of different sizes defining fluid chambers, means providing a low pressure line, and valve means operable automatically in accordance with changes in the pressure in said supply line and operable under a normal pressure therein to connect said chambers to said low pressure line, said valve means operating as an incident to a predetermined increase in said supply pressure to increase the pressure in one of said chambers.

16. A servo control mechanism of the character described, comprising a speed responsive governor, a valve having a fluid supply line and a member movable by said governor between two positions for causing a flow of fluid from said supply line through said valve in opposite directions respectively, a fluid actuator for said valve member for overriding said governor including a piston having oppositely facing areas of different sizes defining fluid chambers, means providing a low pressure line, and valve means operable selectively either to connect both of said chambers to said supply line or to connect one of said chambers to said low pressure line and the other chamber to said supply line.

17. A servo control mechanism of the character described, comprising a speed responsive governor, a valve having a fluid supply line and a member movable by said governor between two positions for causing a flow of fluid from said supply line through said valve in opposite directions respectively, a fluid actuator for said valve member for overriding said governor including a piston, fluid chambers on opposite sides thereof, means providing a low pressure line, and valve means automatically actuated in accordance with changes in the pressure in said supply line and operable under a normal pressure therein to connect said chambers to said low pressure line, said valve means operating as an incident to a predetermined increase in said supply pressure to increase the pressure in one of said chambers.

18. A servo control mechanism of the character described, comprising a speed responsive governor, a valve having a fluid supply line and a member movable by said governor between two positions for causing a flow of fluid from said supply line through said valve in opposite directions respectively, a fluid actuator for said valve member for overriding said governor, including a piston having oppositely facing areas of different sizes defining fluid chambers, means providing a low pressure line, valve means operable to connect said chambers to said low pressure line and place said valve under the control of said governor, and means for actuating said valve means selectively to increase the unit pressure applied to one of said areas relative to the pressure on the other area.

19. A servo control mechanism of the character described, comprising a speed responsive governor, a valve having a fluid supply line and a member movable by said governor between two positions for causing a flow of fluid from said supply line through said valve in opposite directions respectively, a fluid actuator for said valve member for overriding said governor including a piston having oppositely facing areas, and means controlling the energization of said actuator to normally release the pressure on both of said piston areas and operable selectively to apply an increased unit pressure to one of said areas for overriding said governor.

20. A servo control mechanism of the character described, comprising a speed responsive governor, a valve having a fluid supply line and a member movable by said governor between two positions for causing a flow of fluid from said supply line through said valve in opposite directions respectively, a fluid actuator for said valve member for overriding said governor including a piston having oppositely facing areas defining fluid filled chambers, means providing a low pressure line, valve means automatically actuated in accordance with changes in the pressure in said supply line and operable to control the connection between one of said chambers and said low pressure line or supply line, and other valve means selectively operable to connect the other chamber either to said low pressure line or to said supply line.

21. A servo control mechanism of the character described, comprising a speed responsive governor, a valve having a fluid supply line and a member movable by said governor between two positions for causing a flow of fluid from said supply line through said valve in opposite directions respectively, a fluid actuator for said valve member for overriding said governor including a piston having oppositely facing areas, means controlling the application of fluid pressure to one of said areas automatically in response to changes in the pressure in said supply line, and other valve means for independently varying the pressure exerted on said other piston area.

WILLARD J. WHITEHEAD.

REFERENCES CITED

The following references are of record in the file of this patent:

UNITED STATES PATENTS

| Number | Name | Date |
|---|---|---|
| 1,542,878 | Hildebrand | June 23, 1925 |
| 2,273,408 | Woodward | Feb. 17, 1942 |
| 2,276,895 | Vasseler et al. | Mar. 17, 1942 |
| 2,299,824 | Kalin | Oct. 27, 1942 |
| 2,325,009 | Kalin | July 20, 1943 |
| 2,343,416 | Keller | Mar. 7, 1944 |
| 2,364,817 | Reggio | Dec. 12, 1944 |
| 2,388,276 | McCoy | Nov. 6, 1945 |
| 2,407,065 | Martin | June 11, 1946 |

FOREIGN PATENTS

| Number | Country | Date |
|---|---|---|
| 960 | Great Britain | Feb. 21, 1883 |